US010921285B2

(12) United States Patent
Yabe et al.

(10) Patent No.: US 10,921,285 B2
(45) Date of Patent: Feb. 16, 2021

(54) SAMPLE SEPARATING IMPLEMENT AND SAMPLE ANALYZING DEVICE

(71) Applicant: Merck Ltd., Tokyo (JP)

(72) Inventors: Kimihiko Yabe, Kobe (JP); Hiroshi Ohki, Kobe (JP); Takateru Matsunaga, Kobe (JP); Mieko Otonashi, Kobe (JP); Hideki Kinoshita, Kobe (JP); Toru Watsuji, Kobe (JP)

(73) Assignee: Merck Ltd., Tokyo (JP)

( * ) Notice: Subject to any disclaimer, the term of this patent is extended or adjusted under 35 U.S.C. 154(b) by 225 days.

(21) Appl. No.: 16/081,843

(22) PCT Filed: Feb. 20, 2017

(86) PCT No.: PCT/JP2017/006207
§ 371 (c)(1),
(2) Date: Aug. 31, 2018

(87) PCT Pub. No.: WO2017/150259
PCT Pub. Date: Sep. 8, 2017

(65) Prior Publication Data
US 2019/0025251 A1    Jan. 24, 2019

(30) Foreign Application Priority Data
Mar. 4, 2016   (JP) .................. 2016-042841

(51) Int. Cl.
*G01N 27/447*   (2006.01)
*G01N 35/10*    (2006.01)

(52) U.S. Cl.
CPC ..... *G01N 27/44739* (2013.01); *G01N 27/447* (2013.01); *G01N 27/44743* (2013.01); *G01N 35/10* (2013.01)

(58) Field of Classification Search
None
See application file for complete search history.

(56) References Cited

U.S. PATENT DOCUMENTS

| 4,631,122 A | 12/1986 | Pohl | |
|---|---|---|---|
| 2009/0127118 A1* | 5/2009 | Unuma | ............ G01N 27/44739 204/641 |
| 2011/0094887 A1* | 4/2011 | Midorikawa | ...... G01N 27/4473 204/641 |

FOREIGN PATENT DOCUMENTS

| EP | 0619882 B1 * | 3/2001 | ....... G01N 27/44717 |
|---|---|---|---|
| JP | 1-112147 A | 4/1989 | |

(Continued)

OTHER PUBLICATIONS

International Search Report and Written Opinion received for PCT Application No. PCT/JP2017/006207, dated Apr. 25, 2017, 15 pages (8 pages of english translation and 7 pages of original copy).

(Continued)

*Primary Examiner* — J. Christopher Ball
(74) *Attorney, Agent, or Firm* — EMD Millipore Corporation

(57) ABSTRACT

Provided is a novel sample separating instrument and a novel sample analyzing device each of which can be suitably used for emission transfer. A sample separating instrument (100) for use in emission transfer includes: a separation medium (10); and a holding section (21), the holding section (21) having an opening (21*b*) on an end part side, the separation medium (10) having an exposed part (10*b*), the exposed part (10*b*) having extending parts (10*a*) which extend on respective edge parts (21*a*) of the holding section (21) which edge parts are located on respective both sides of the opening (21*b*).

30 Claims, 14 Drawing Sheets

(56) References Cited

FOREIGN PATENT DOCUMENTS

| | | | |
|---|---|---|---|
| JP | 2007-292616 A | 11/2007 | |
| JP | 2009-063454 A | 3/2009 | |
| JP | 2010-008376 A | 1/2010 | |
| JP | 2011-080842 A | 4/2011 | |
| JP | 2011-145137 A | 7/2011 | |
| JP | 2011196914 A * | 10/2011 | |
| JP | 2013-124916 A | 6/2013 | |
| JP | 5236609 B2 * | 7/2013 | |
| WO | WO-2011106693 A2 * | 9/2011 | ....... G01N 27/44739 |
| WO | 2015/093282 A1 | 6/2015 | |
| WO | 2017/150259 A | 9/2017 | |

OTHER PUBLICATIONS

International Preliminary Report on Patentability received for PCT Application No. PCT/JP2017/006207 dated Sep. 13, 2018, 13 pages (8 pages of english translation and 5 pages of original copy).
Extended European Search Report received for European Patent Application No. 17759725.9, dated Mar. 6, 2019, 9 pages.

* cited by examiner

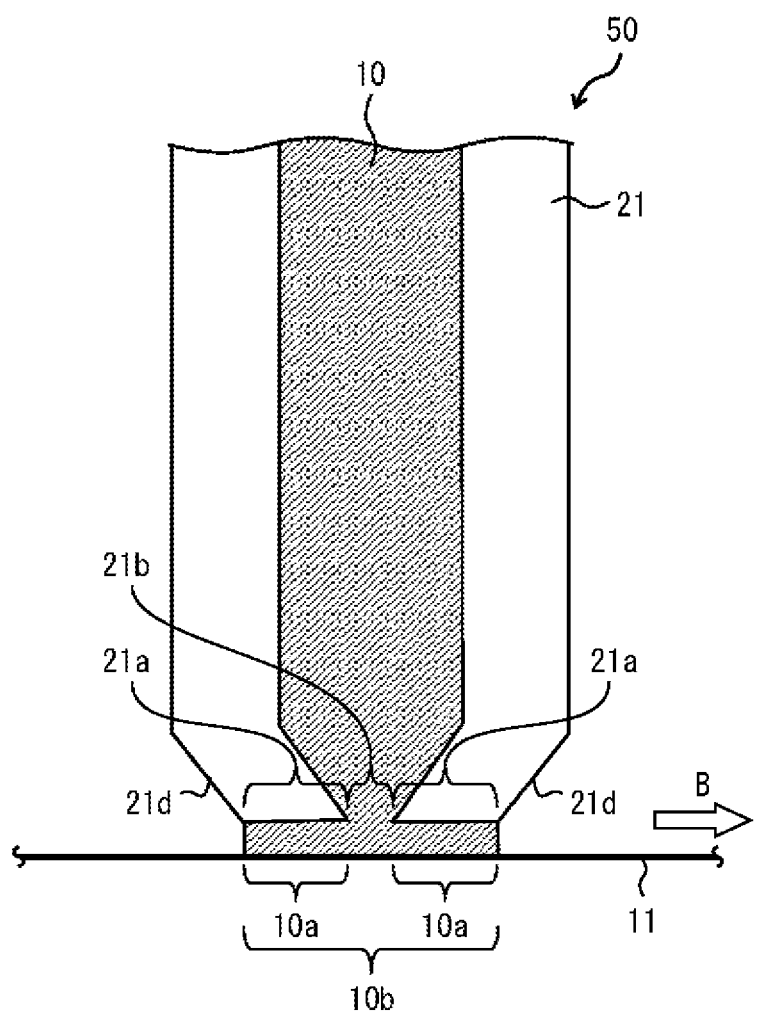

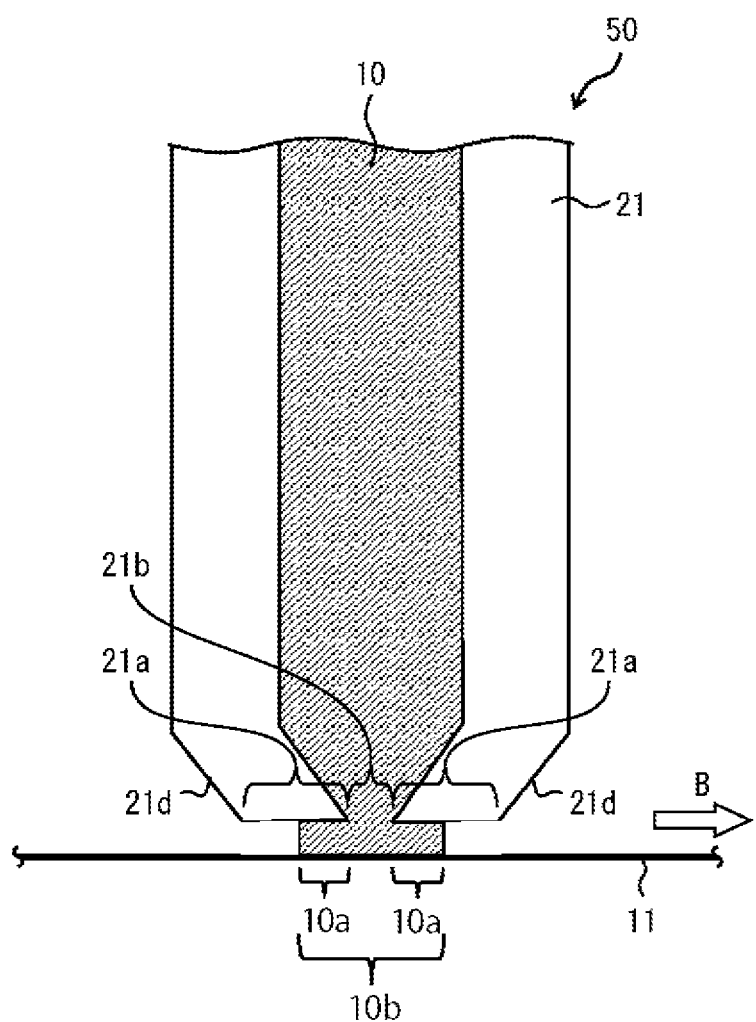

SAMPLE SEPARATING IMPLEMENT AND SAMPLE ANALYZING DEVICE

TECHNICAL FIELD

The present invention relates to a sample separating instrument and a sample analyzing device each of which is used to analyze a sample through use of electrophoresis.

BACKGROUND ART

The inventors of the present invention have developed their own unique technique, referred to as emission transfer, as one of techniques for analyzing a sample containing a biomolecule and the like (Patent Literature 1). The emission transfer is a technique in which a sample is electrophoresed in a separation medium and the sample emitted from an end part of the separation medium is transferred to a transfer membrane that is moved in a state where the transfer membrane is in contact with the end part of the separation medium. According to the emission transfer, a procedure of electrophoresing and transferring a sample, which procedure has needed complicated steps, is simplified.

Furthermore, in Patent Literature 1, the inventors of the present invention have realized easy transfer by using, in the emission transfer, a sample separating instrument including a separation medium and a holding section which holds the separation medium.

CITATION LIST

Patent Literature

[Patent Literature 1]
Japanese Patent Application Publication, Tokukai, No. 2011-80842 (published on Apr. 21, 2011)

SUMMARY OF INVENTION

Technical Problem

In a sample analysis, easiness and an improvement in transfer speed have been demanded. According to the emission transfer, in a case where it is intended that a transfer speed is improved, it is preferable to increase a speed at which the transfer membrane is moved. However, in a case where the speed at which the transfer membrane is moved is increased, a load imposed on the end part of the separation medium, which end part is in contact with the transfer membrane, may be increased due to friction.

Therefore, a sample separating instrument has been demanded which is more durable than a conventional sample separating instrument (for example, Patent Literature 1).

The present invention has been made in view of the above problem, and a main object of the present invention is to provide (i) a sample separating instrument including a separation medium whose end part is highly durable and (ii) a sample analyzing device including such a sample separating instrument.

Solution to Problem

In order to attain the above object, a sample separating instrument in accordance with an aspect of the present invention is a sample separating instrument, for use in emission transfer, which includes a separation medium and a holding section, the separation medium, in which a sample is electrophoresed, having an end part from which the sample is emitted and transferred to a transfer membrane that is moved in a state where the transfer membrane is in contact with the end part of the separation medium, the holding section, which holds the separation medium, having an opening on an end part side, the separation medium having an exposed part which is exposed outside the holding section through the opening, the exposed part having an extending part which extends on an edge part of the holding section which edge part is located on a side of the opening.

Further, a sample separating instrument in accordance with another aspect of the present invention is a sample separating instrument, for use in emission transfer, which includes a separation medium and a holding section, the separation medium, in which a sample is electrophoresed, having an end part from which the sample is emitted and transferred to a transfer membrane that is moved in a state where the transfer membrane is in contact with the end part of the separation medium, the holding section, which holds the separation medium, having an opening on an end part side, the separation medium having an exposed part which is exposed outside the holding section through the opening.

Advantageous Effects of Invention

According to an aspect of the present invention, it is possible to provide (i) a sample separating instrument including a separation medium whose end part is highly durable and (ii) a sample analyzing device including such a sample separating instrument.

BRIEF DESCRIPTION OF DRAWINGS

FIG. 4A is a side cross-sectional view schematically illustrating a configuration of a sample separating instrument in accordance with Embodiment 1 of the present invention.

FIG. 4C is a side cross-sectional view schematically illustrating further another configuration of the sample separating instrument in accordance with Embodiment 1 of the present invention.

DESCRIPTION OF EMBODIMENTS

The present invention provides a sample separating instrument for use in emission transfer, the sample separating instrument including: a separation medium; and a holding section which holds the separation medium, the separation medium having an end part, the holding section having an opening on an end part side, the separation medium having an exposed part which is exposed outside the holding section through the opening, the exposed part having an extending part which extends on an edge part of the holding section which edge part is located on a side of the opening. Note that, as used herein, the emission transfer means a technique in which a sample is electrophoresed in a separation medium and the sample emitted from an end part of the separation medium is transferred to a transfer membrane that is moved in a state where the transfer membrane is in contact with the end part of the separation medium.

Furthermore, the present invention provides a sample analyzing device including: a sample separating instrument in accordance with an embodiment of the present invention; an electrode via which an electric current is applied to the separation medium; a transfer membrane; and a moving section which moves the transfer membrane or the separation medium in a state where the transfer membrane is in contact with the end part of the separation medium.

Here, Patent Literature 1 discloses a configuration in which a separation medium is held by a sample separating section and a transfer auxiliary body, which is different from the separation medium, is attached to a tip of the separation medium via or without a porous membrane. Furthermore, Patent Literature 1 also discloses a configuration in which the tip of the separation medium held by the sample separating section is exposed from the sample separating section.

The sample separating instrument in accordance with an embodiment of the present invention is different from the former configuration in that the separation medium has the exposed part which is exposed outside the holding section through the opening of the holding section. Furthermore, the sample separating instrument in accordance with an embodiment of the present invention is different from the latter configuration in that the exposed part has the extending part which extends on the edge part of the holding section which edge part is located on the side of the opening.

The following description will discuss, in detail, configurations and effects of embodiments of the present invention with reference to the drawings.

An outline of a configuration of a sample analyzing device 100 in accordance with an embodiment (Embodiment 1) of the present invention will be described below with reference to FIGS. 1 through 6.

(Sample Analyzing Device)

Figure 1:
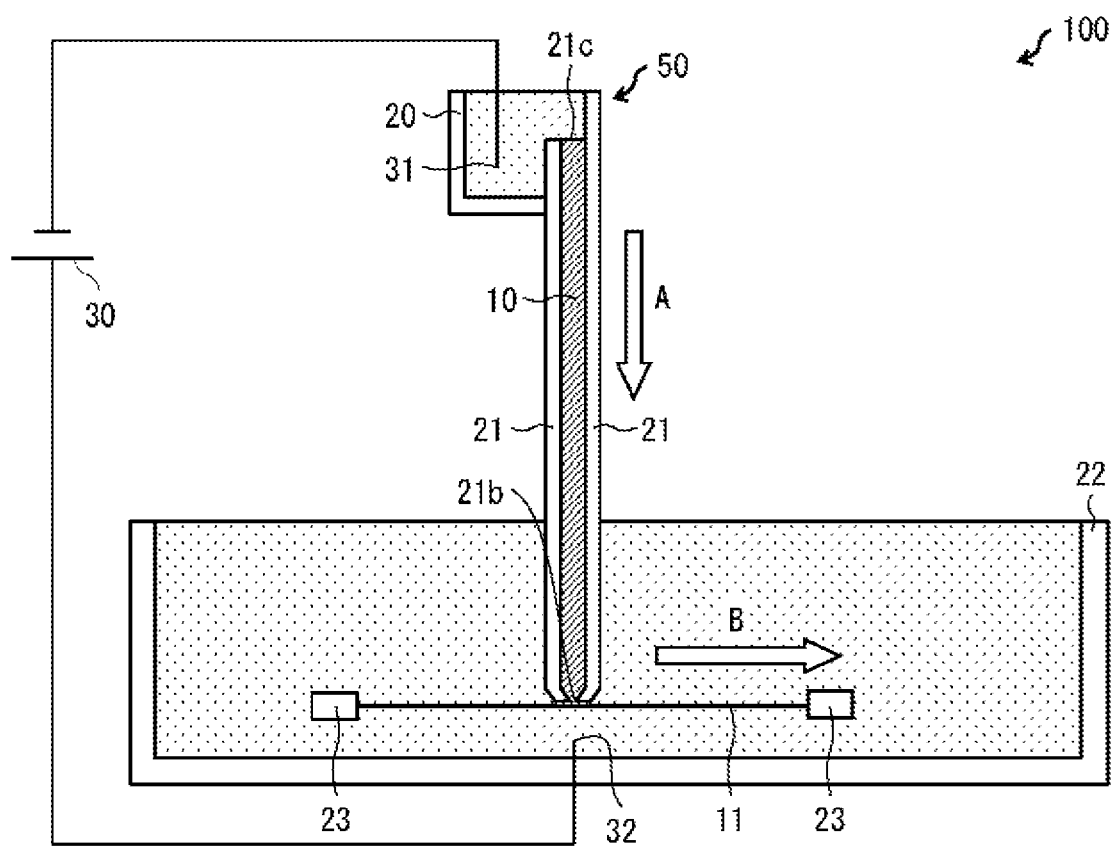
FIG. 1 is a side cross-sectional view schematically illustrating a configuration of a sample analyzing device in accordance with Embodiment 1 of the present invention.
Figure 2:
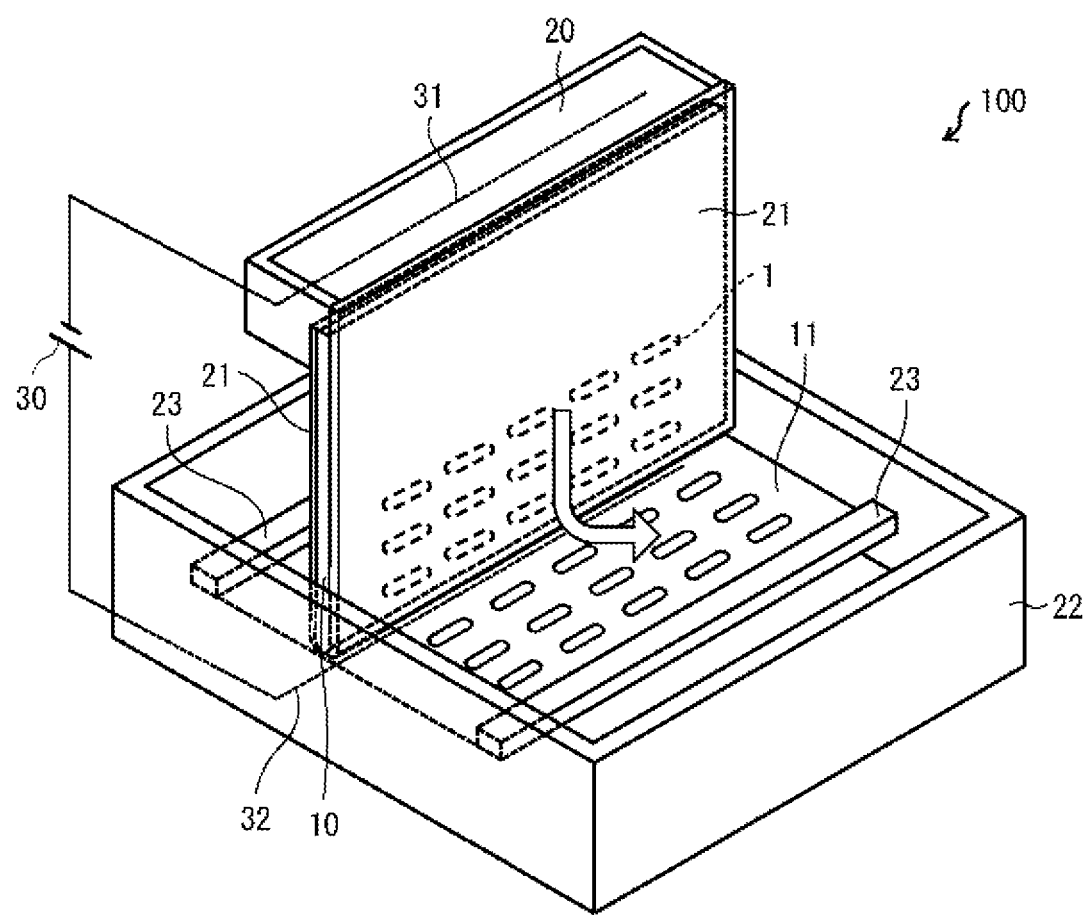
FIG. 2 is a perspective view schematically illustrating the configuration of the sample analyzing device in accordance with Embodiment 1 of the present invention.
Figure 3:
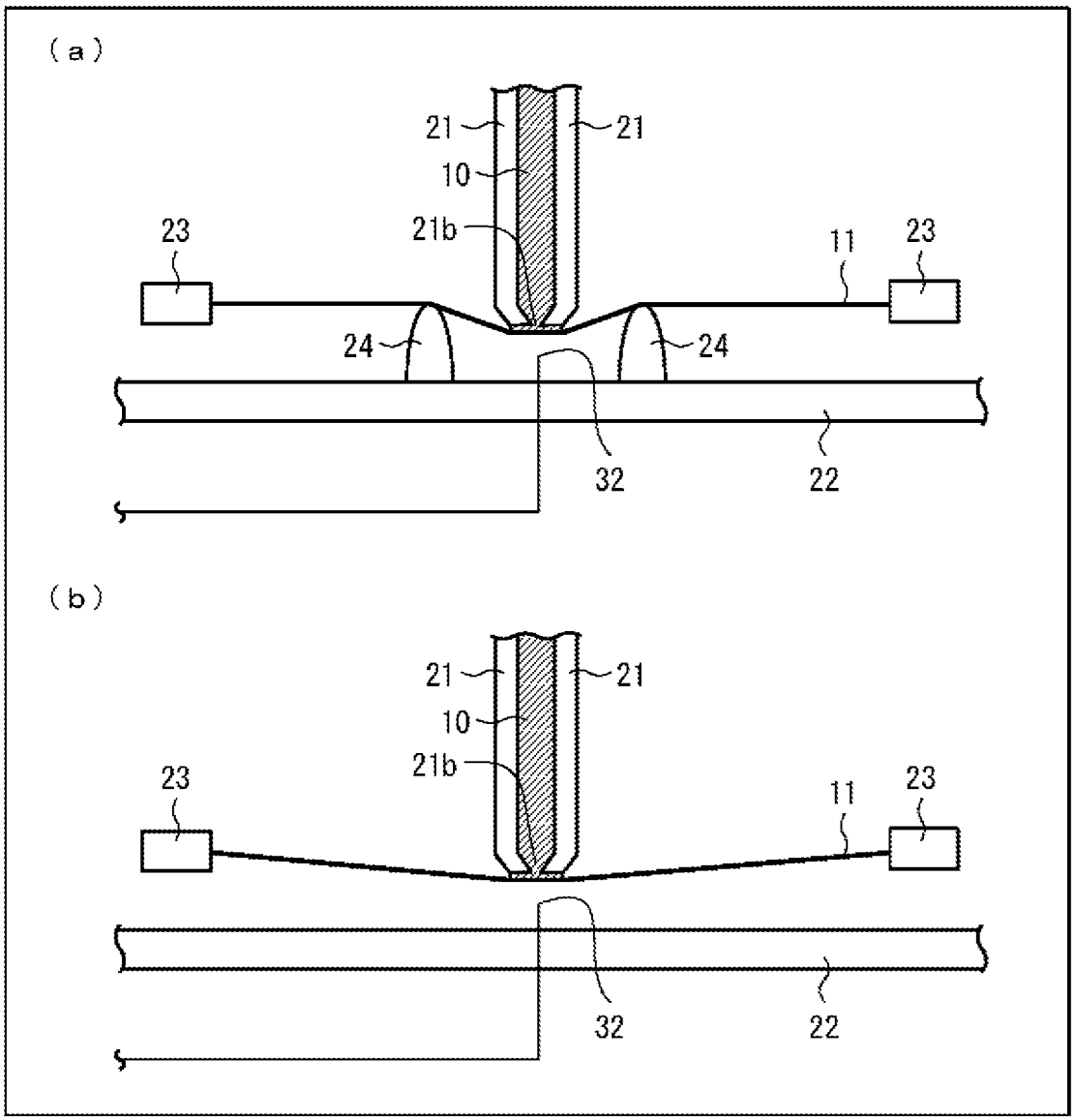
FIG. 3 is a side cross-sectional view illustrating a configuration for applying a tensile force, directed to a separation medium, to a transfer membrane while a moving section moves the transfer membrane, in the sample analyzing device in accordance with Embodiment 1 of the present invention.

FIG. 1 is a side cross-sectional view schematically illustrating the configuration of the sample analyzing device 100 in accordance with Embodiment 1 of the present invention. FIG. 2 is a perspective view schematically illustrating the configuration of the sample analyzing device 100 in accordance with Embodiment 1 of the present invention.

As illustrated in FIGS. 1 and 2, the sample analyzing device 100 includes a sample separating instrument 50, a transfer membrane 11, a negative electrode buffer solution tank 20, a positive electrode buffer solution tank 22, a moving section 23, a power source 30, a negative electrode (electrode) 31, and a positive electrode (electrode) 32. The sample separating instrument 50 includes a separation medium 10 and a holding section 21.

The holding section 21 holds the separation medium 10. The holding section 21 has (i) an opening 21b which is opened in the positive electrode buffer solution tank 22 and an opening 21c which is opened in the negative electrode buffer solution tank 20.

In each of the negative electrode buffer solution tank 20 and the positive electrode buffer solution tank 22, buffer solution is poured. In the negative electrode buffer solution tank 20, the negative electrode 31 is disposed. In the positive electrode buffer solution tank 22, the positive electrode 32 is disposed. The power source 30 is connected to the negative electrode 31 and the positive electrode 32.

In the positive electrode buffer solution tank 22, the transfer membrane 11 is disposed so as to be in contact with an end part of the separation medium 10 which end part is located on an opening 21b side (hereinafter, referred to as an opening-21b-side end part). In Embodiment 1, the moving section 23 moves the transfer membrane 11 in a state where the transfer membrane 11 is in contact with the opening-21b-side end part of the separation medium 10.

According to the sample analyzing device 100, by introducing a sample into the separation medium 10 through the opening 21c and (ii) causing the power source 30 to apply a voltage to each of the negative electrode 31 and the positive electrode 32, it is possible to electrophorese, in the separation medium 10, the sample 1 in a direction toward the opening 21b from the opening 21c ("A" direction shown in FIG. 1). Then, it is possible to transfer (absorb) the sample 1, having been separated and then emitted from the opening-21b-side end part of the separation medium 10 by such electrophoresis, to the transfer membrane 11 which is moved, by the moving section 23, in a direction non-parallel to a direction in which the sample 1 is separated (hereinafter, referred to as a separation direction), in a state where the transfer membrane 11 is in contact with the opening-21b-side end part. This makes it possible to suitably realize the emission transfer.

Note that the transfer membrane 11 is preferably moved by the moving section 23 while a tensile force, directed toward the separation medium 10, is applied to the transfer membrane 11. This allows the transfer membrane 11 to be in closer contact with the separation medium 10, and accordingly allows the sample, emitted from the separation medium 10, to be suitably transferred to the transfer membrane 11.

As a configuration for applying the tensile force, directed toward the separation medium 10, to the transfer membrane 11 while the moving section 23 moves the transfer membrane 11, the following configuration is, for example, employed. That is, guides 24 are provided, at respective locations between which the opening 21b of the holding section 21 is sandwiched, so as to be in contact with the transfer membrane 11 from a side of the transfer membrane 11 which side is opposite to the separation medium 10 (see (a) of FIG. 3). By such a configuration, the transfer membrane 11 is put in a state where the transfer membrane 11 is pushed down by the separation medium 10, from a state where the transfer membrane 11 is linearly stretched between the guides 24. That is, the transfer membrane 11 is put in a state where the tensile force, directed toward the separation medium 10, is applied to the transfer membrane 11. This allows the transfer membrane 11 to be in closer contact with the separation medium 10.

Note that part of each of the guides 24 which part is in contact with the transfer membrane 11 is preferably smooth so that the transfer membrane 11 can be moved in a state where the transfer membrane 11 is in contact with the guides 24. Each of the guides 24 can be made of, for example, an insulator such as a resin.

Alternatively, as the configuration for applying the tensile force, directed toward the separation medium 10, to the transfer membrane 11 while the moving section 23 moves the transfer membrane 11, the following configuration is, for example, employed. That is, the moving section 23 is disposed at a location higher than that of the opening-21b-side end part of the separation medium 10 (location on an opening 21c side) (see (b) of FIG. 3). Such a configuration also makes it possible to put the transfer membrane 11 in a state where the tensile force, directed toward the separation medium 10, is applied to the transfer membrane 11.

(Sample Separating Instrument)

FIG. 4A is a side cross-sectional view schematically illustrating a configuration of the sample separating instrument 50 in accordance with Embodiment 1 of the present invention. As illustrated in FIG. 4A, the separation medium 10 has an exposed part 10b which is exposed outside the holding section 21 through the opening 21b. The exposed part 10b has extending parts 10a which extend on respective edge parts 21a of the holding section 21 which edge parts 21a are located on respective both sides of the opening 21b. The exposed part 10b is in contact with the transfer membrane 11.

Since the exposed part 10b of the separation medium is in contact with the transfer membrane 11, it is possible to suitably transfer, to the transfer membrane 11, the sample 1 which has been separated in the separation medium 10. Furthermore, by forming, from a single member, the exposed part 10b and the separation medium 10 which is held in the holding section 21, it is possible to easily produce the sample separating instrument.

The sample 1, having been separated in the separation medium 10 which is held in the holding section 21, passes through the opening 21b and part of the exposed part 10b which part corresponds to the opening 21b (hereinafter, referred to as an opening--21b-corresponding part), and is then transferred to the transfer membrane 11. Note, here, that the extending parts 10a which are located on respective both sides of the opening-21b-corresponding part of the exposed part 10b function as a protecting part which protects the opening-21b-corresponding part of the exposed part 10b. Therefore, it is possible to suitably prevent such a problem that the opening-21b-corresponding part of the exposed part 10b is worn out and damaged due to friction between the exposed part 10b and the transfer membrane 11 and, accordingly, transfer becomes impossible. Furthermore, it is possible to suitably prevent such a problem that the opening-21b-corresponding part of the exposed part 10b is pulled and distorted by the transfer membrane 11 and, accordingly, an electrophoretic pattern is distorted. This allows an improvement in durability of the end part of the separation medium 10 which end part is in contact with the transfer membrane 11. Note that, as used herein, the durability of the end part of the separation medium 10 indicates how long it is possible to maintain a state where good transfer can be carried out.

Note that the extending parts 10a preferably extend, from the opening 21b, on the respective edge parts 21a in a direction in which the transfer membrane 11 is moved ("B" direction shown in FIG. 4A, hereinafter referred to as a movement direction) and in a direction opposite to the movement direction. This allows the opening-21b-corresponding part of the exposed part 10b to be suitably protected from the friction between the exposed part 10b and the transfer membrane 11.

Furthermore, according to one viewpoint, a width by which each of the extending parts 10a extends from the opening 21b is preferably equal to or greater than a width, in a direction in which each of the extending parts 10a extends, of the opening 21b. This allows the opening-21b-corresponding part of the exposed part 10b to be protected by the extending parts 10a. each having a sufficient width.

According to another viewpoint, the width by which each of the extending parts 10a extends from the opening 21b is more preferably not less than 1 µm and not more than 10000 µm, still more preferably not less than 100 µm and not more than 2000 µm. By setting, at not less than 100 µm, the width by which each of the extending parts 10a extends from the opening 21b, it is possible to protect the opening-21b-corresponding part of the exposed part 10b by the extending parts 10a each having a sufficient width. By setting, at not more than 1000 µm, the width by which each of the extending parts 10a extends from the opening 21b, it is possible to reduce an area of a region of the transfer membrane 11 which region is to be in contact with the exposed part 10b, and accordingly possible to reduce the friction between the exposed part 10b and the transfer membrane 11. This ultimately allows the transfer membrane 11 to be suitably moved.

A thickness of the exposed part 10b (that is, a thickness of each of the extending parts 10a which extend on the respective edge parts 21a) is preferably not less than 1 µm and not more than 2 mm, more preferably not less than 50 µm and not more than 200 µm. By setting the thickness of the exposed part 10b in the above range, it is possible to cause the exposed part 10b to keep strength.

Figure 4B:
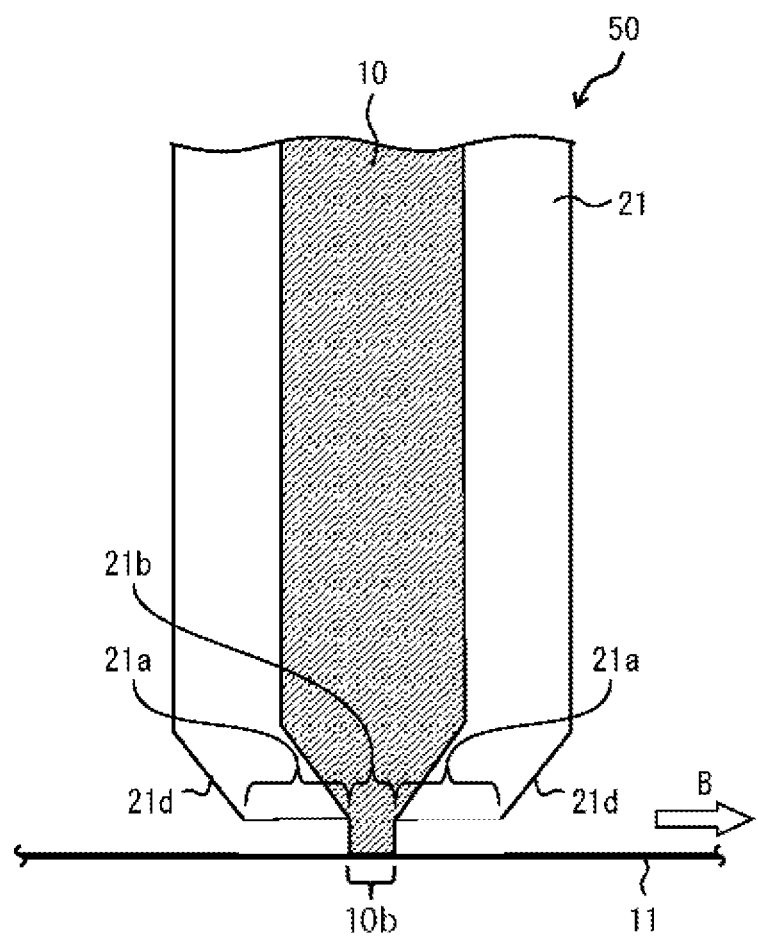
FIG. 4B is a side cross-sectional view schematically illustrating another configuration of the sample separating instrument in accordance with Embodiment 1 of the present invention.

The exposed part 10b can have the extending parts 10a from the beginning. Alternatively, the exposed part 10b can be arranged so as not to have the extending parts 10a at first as illustrated in FIG. 4B. Here, a case is assumed where the exposed part 10b does not have the extending parts 10a at first. In this case, by, for example, bringing the holding section 21 closer to the transfer membrane 11 so that the exposed part 10b is pressured against the transfer membrane 11, it is possible to cause the exposed part 10b to have the extending parts 10a as illustrated in FIG. 4C, and further possible to cause the exposed part 10b to have the extending parts 10a as illustrated in FIG. 4A. This applies to the other embodiments later described.

Figure 5:
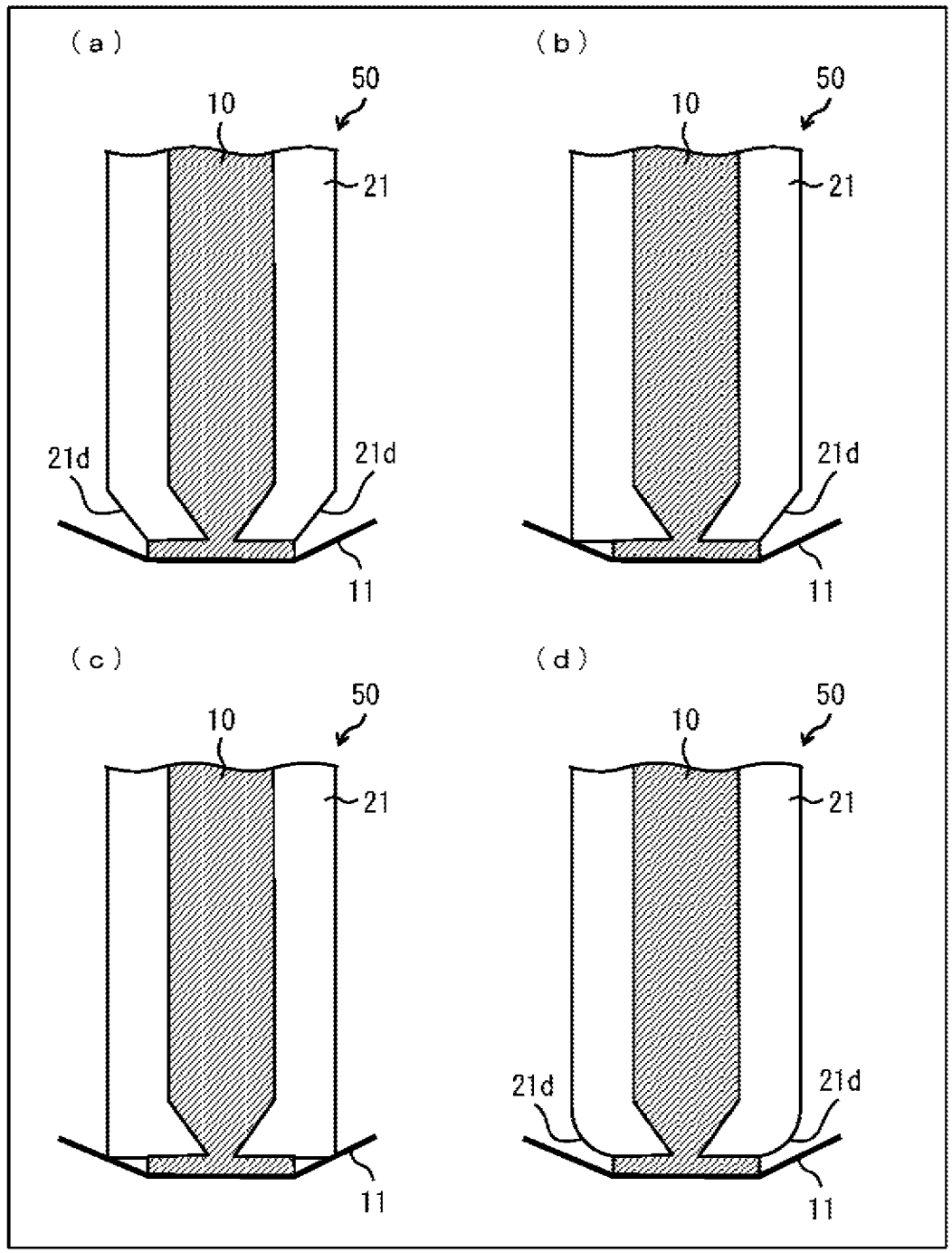
FIG. 5 is a side cross-sectional view illustrating variations of a notch in the sample separating instrument in accordance with Embodiment 1 of the present invention.

In an embodiment, an end part of the holding section which end part is located on the opening 21b side (hereinafter, referred to as an opening-21b-side end part) can have a notch 21d. FIG. 5 is a side cross-sectional view illustrating variations of the notch 21d in the sample separating instrument 50. (a) of FIG. 5 illustrates a configuration in which the notch 21d is provided on each of an upstream side and a downstream side, in the movement direction in which the transfer membrane 11 is moved, of the opening-21b-side end part of the holding section 21. (b) of FIG. 5 illustrates a configuration in which the notch 21d is provided on one of the upstream side and the downstream side, in the movement direction in which the transfer membrane 11 is moved, of the opening-21b-side end part of the holding section 21. (c) of FIG. 5 illustrates a configuration in which the notch 21d is not provided in the opening-21b-side end part of the holding section 21.

According to Embodiment 1, any one of the above configurations can be employed. However, by providing the notch 21d in the opening-21b-side end part of the holding section 21 as illustrated in (a) and (b) of FIG. 5, particularly, as illustrated in (a) of FIG. 5, it is possible to reduce an area of a region of the transfer membrane 11 which region is to be in contact with the holding section 21, as compared with a case where the notch 21d is not provided in the opening-21b-side end part of the holding section 21 as illustrated in of FIG. 5. This makes it possible to reduce friction between the transfer membrane 11 and the holding section 21, and accordingly makes it possible to prevent the transfer membrane 11 from being abraded.

In particular, by rounding the notch 21d as illustrated in (d) of FIG. 5, it is possible to prevent the transfer membrane 11 from being caught on a corner of the holding section 21, and accordingly possible to cause the transfer membrane 11 to be in closer contact with the exposed part 10b. This allows the sample 1 to be more suitably transferred to the transfer membrane 11.

Note that the holding section 21 can be constituted by, for example, two insulating plates each made of an insulator such as glass or an acrylic material. In an embodiment, the holding section 21 is configured such that, in the opening 21c, part of one of the two insulating plates is chipped so that the separation medium 10 is exposed to the negative electrode buffer solution tank 20. This allows the sample 1 to be easily introduced into the separation medium 10.

The separation medium 10 is a medium in which components, contained in the sample 1 having been introduced into the separation medium 10 through the opening 21c, are separated by the electrophoresis on the basis of a property such as a molecular weight. Examples of the separation medium 10 include gels such as an acrylamide gel and an agarose gel. Note, however, that the separation medium 10 is not limited to such examples. A transverse width of the separation medium 10 can be such a width that it is possible to separate a sample of, for example, 10 lanes to 12 lanes.

Figure 6:
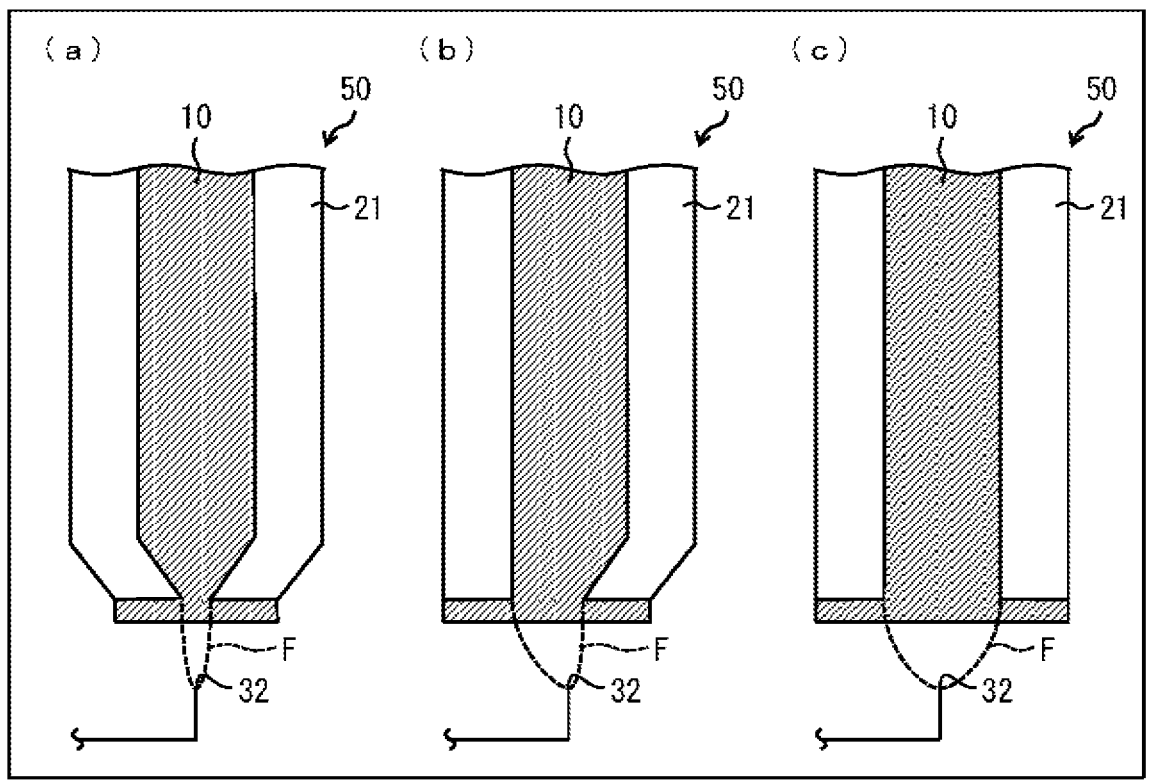
FIG. 6 is a side cross-sectional view illustrating variations of a shape of the separation medium included in the sample separating instrument in accordance with Embodiment 1 of the present invention.

In an embodiment, the separation medium 10 which is held in the holding section 21 can be tapered toward the opening 21b. FIG. 6 is a side cross-sectional view illustrating variations of a shape of the separation medium 10 included in the sample separating instrument 50. (a) and (b) of FIG. 6 each illustrate a configuration in which the separation medium 10 which is held in the holding section 21 is tapered toward the opening 21b. (a) of FIG. 6 illustrates a configuration in which the separation medium 10 which is held in the holding section 21 has slopes on respective both sides. (b) of FIG. 6 illustrates a configuration in which the separation medium 10 which is held in the holding section 21 has a slope on one side. (c) of FIG. 6 illustrates a configuration in which the separation medium 10 which is held in the holding section 21 is not tapered.

According to Embodiment 1, any one of the above configurations can be employed. However, by (i) tapering, toward the opening 21b, the separation medium 10 which is held in the holding section 21 and (ii) reducing the width of the opening 21b, as illustrated in (a) and (b) of FIG. 6, particularly, as illustrated in (a) of FIG. 6, it is possible to converge electric flux lines F formed between the opening 21b and the positive electrode 32, as compared with a case where the separation medium 10 which is held in the holding section 21 is not tapered as illustrated in (c) of FIG. 6. This allows a pattern, obtained by transfer of the sample, to be clear.

Here, a width (width in a direction perpendicular to the separation direction, width in a lateral direction in FIG. 6) of the separation medium 10 which is held in the holding section 21 can be, for example, not less than 1 mm and not more than 2 mm. By setting, in the above range, the width of the separation medium 10 which is held in the holding section 21, it is possible to avoid an increase in amount of an electric current flowing during the electrophoresis, and accordingly possible to avoid excessive heat generation. Furthermore, it is possible to ensure uniformity in a width direction.

Moreover, it is possible to taper the separation medium 10, held in the holding section 21, toward the opening 21b so that a width, in the lateral direction, of part of the separation medium 10 which part is located in the opening 21b is, for example, not less than 100 μm and not more than 1 mm. In particular, by setting, at not more than 500 μm, the width, in the lateral direction, of the part of the separation medium 10, which part is located in the opening 21b, it is possible to suitably converge the electric flux lines F. This allows the pattern, obtained by the transfer of the sample, to be clearer.

A width (width in the direction perpendicular to the separation direction, width in the lateral direction in FIG. 6) of the holding section 21 can be, for example, not less than 2 mm and not more than 3 mm. Note, however, that the width of the holding section 21 is not limited to such a range. The width of the holding section 21 can be narrowed in a vicinity of the opening 21b.

The sample separating instrument 50 can be produced by, for example, (i) disposing the holding section 21 above hydrophilic glass so that the holding section 21 is apart from the hydrophilic glass by a distance corresponding to the thickness of the exposed part 10b, (ii) filling the holding section 21 with a precursor (for example, a monomer and a reacting agent each for forming a gel) for forming the separation medium 10, solidifying the precursor, and then (iv) cut the end part of the separation medium 10 thus obtained so that the end part of the separation medium 10 has a desired shape. Note, however, that how to produce the sample separating instrument 50 is not limited to such a method.

In Embodiment 1, the sample separating instrument 50 is provided almost vertically (see FIGS. 1 and 2). A lower part of the sample separating instrument 50 is disposed in the positive electrode buffer solution tank 22, and an upper part of the sample separating instrument 50 is disposed so as to be in contact with the negative electrode buffer solution tank 20. This allows the separation medium 10 to be cooled down by at least one of the buffer solution stored in the positive electrode buffer solution tank 22 and the buffer solution stored in the negative electrode buffer solution tank 20. It is therefore possible to sufficiently cool down the separation medium 10. Note, however, that the present invention is not limited to such a configuration. Alternatively, the sample separating instrument 50 can be provided horizontally.

(Transfer Membrane)

The transfer membrane 11 is preferably a sample absorbing and retaining body which allows the sample, separated in the separation medium 10, to be stably stored over a long time period and which facilitates a subsequent analysis. The transfer membrane 11 is preferably made of a material having high strength and having a high sample binding capacity (absorbed weight per unit area). In a case where the sample is a protein, a PVDF membrane or the like is suitable as the transfer membrane 11. Note that the PVDF membrane is preferably subjected to a hydrophilization treatment in advance with use of methanol or the like. Besides the PVDF membrane, membranes which have been conventionally used to absorb a protein, DNA, and a nucleic acid, such as a nitrocellulose membrane and a nylon membrane, can be each also used.

The transfer membrane 11 is used in a state where the transfer membrane 11 is soaked in the buffer solution in the positive electrode buffer solution tank 22. In an embodiment, the transfer membrane 11 only needs to have a length used in single electrophoresis and transfer. In other words, the transfer membrane 11 only needs to have a length corresponding to a distance which the transfer membrane 11 is moved in the positive electrode buffer solution tank 22 in single electrophoresis and transfer. By configuring the transfer membrane 11 as above, it becomes unnecessary to cut the transfer membrane 1 every electrophoresis and transfer. It is therefore possible to improve usability of the sample analyzing device 100. Further, a transverse width of the transfer membrane 11 only needs to correspond to the transverse width of the separation medium 10.

(Negative Electrode and Positive Electrode)

Each of the negative electrode 31 and the positive electrode 32 is made of an electrically conductive material such as a metal. Each of the negative electrode 31 and the positive electrode 32 is preferably made of platinum, in view of suppression of ionization of each of the negative electrode 31 and the positive electrode 32.

How to dispose the negative electrode 31 and the positive electrode 32 is not limited in particular. However, the positive electrode 32 is preferably disposed so as to face the opening 21b. This causes the electric flux lines, which pass through the opening 21b, to be substantially perpendicular to the transfer membrane 11. It is therefore possible to improve accuracy of absorption of the sample.

Furthermore, the positive electrode 32 is preferably disposed so as to be apart from the transfer membrane 11. This makes it possible to prevent bubbles, generated from the positive electrode 32, from adversely affecting absorption of separated components to the transfer membrane 11.

In Embodiment 1, the positive electrode 32 and the negative electrode 31 are connected to the power source 30. Alternatively, the positive electrode 32 and the negative electrode 31 can be connected to, for example, a control section and be used. Alternatively, the positive electrode 32 and the negative electrode 31 can be connected to an external power supply (direct-current power supply device) and be used. In a case where the positive electrode 32 and the negative electrode 31 are connected to an external power supply and are used, time, an electric current, and a voltage are set on the external power supply, and then, simultaneously with start of operation of the external power supply, a control section is operated so that the sample analyzing device 100 starts to operate.

(Positive Electrode Buffer Solution Tank and Negative Electrode Buffer Solution Tank)

Each of the positive electrode buffer solution tank 22 and the negative electrode buffer solution tank 20 is an insulating container in which the buffer solution is retained. In Embodiment 1, the negative electrode buffer solution tank 20 is provided above the positive electrode buffer solution tank 22.

The buffer solution put in each of the positive electrode buffer solution tank 22 and the negative electrode buffer solution tank 20 can be any electrically conductive buffer solution. In particular, a buffer solution can be suitably used whose buffering area is weak acidity to weak basicity. Examples of such a buffer solution include a Tris/glycine-based buffer solution, an acetic acid buffer solution, a sodium carbonate-based buffer solution, a CAPS buffer solution, a Tris/boric acid/EDTA buffer solution, a Tris/acetic acid/EDTA buffer solution, MOPS, a phosphate buffer solution, and a Tris/tricine-based buffer solution.

(Moving Section)

A configuration of the moving section 23 is not limited in particular, provided that the moving section 23 is one that moves the transfer membrane 11 in a state where the transfer membrane 11 is in contact with the exposed part 10b of the separation medium 10. For example, the moving section 23 can be made up of (i) frames which respectively fix a front end part and a rear end part, in the movement direction, of the transfer membrane 11 and (a driving section which moves the frames. A configuration of the driving section is riot limited in particular. For example, a configuration such as a ball screw mechanism or a rack-and-pinion mechanism can be employed. Alternatively, the moving section 23 can be configured such that, for example, rollers send the transfer membrane 11 which is rolled up.

By the moving section 23 thus moving the transfer membrane 11 relative to the exposed part 10b of the separation medium 10, it is possible to transfer the components of the sample 1 to respective different locations on the transfer membrane 11 depending on time at which the components are emitted from the separation medium 10. It is therefore possible to suitably realize the emission transfer.

(Electrophoresis and Transfer of Sample)

Next, the electrophoresis and the transfer of the sample 1, which electrophoresis and transfer are carried out in the sample analyzing device 100, will be described below in detail. Note that examples of the sample 1 used in the sample analyzing device 100 include, but are not limited to, preparations prepared from biological materials (for example, an organism, a body fluid, a cell line, a tissue culture, or a tissue fragment) and (ii) commercially available reagents. For example, the sample 1 can be polypeptide or polynucleotide.

First, the sample 1 is introduced into the separation medium 10 through the opening 21c of the sample separating instrument 50. The sample 1 can contain, in addition to an analysis target, a visible molecular weight marker with reference to which progress of the electrophoresis is checked.

The power source 30 applies an electric current to each of the positive electrode 32 and the negative electrode 31 so that the electrophoresis starts. A value of the electric current applied to each of the positive electrode 32 and the negative electrode 31 is not limited in particular, but is preferably not more than 50 mA, more preferably not less than 20 mA and not more than 30 mA. Note that the value of the electric current can be controlled by a control section or the like so as to be constant. Note also that the voltage can be controlled by a control section or the like so as to be constant. Alternatively, the electric current and the voltage can be controlled by any other method.

The transfer membrane 11 is gradually moved by the moving section 23 in a state where the transfer membrane is in contact with the separation medium 10, in accordance with the progress of the electrophoresis carried out in the sample separating instrument 50. A speed at which the transfer membrane 11 is moved is not limited in particular. For example, the speed can be such a speed that the transfer membrane 11 is moved 5 cm to 10 cm in 60 minutes to 120 minutes.

Then, the sample 1 (which has been separated in the separation medium 10) emitted through the opening 21b by the electrophoresis is absorbed to a location on the transfer membrane 11 which location corresponds to a timing at which the sample 1 is emitted (that is, which location faces the opening 21b at the timing at which the sample 1 is emitted). As a result, the sample which has been separated is transferred to the transfer membrane 11.

After the transfer, the transfer membrane 11 is collected. The transfer membrane 11 can be subjected to staining, an immune reaction, or the like (blocking and an antigen-antibody reaction in the western blotting method). Thereafter, a separation pattern of the components transferred to the transfer membrane 11 is detected with use of a fluorescent detector or the like. Such a fluorescent detector can be incorporated in the sample analyzing device 100. This allows all steps, including the electrophoresis, the transfer, and detection, to be automated.

Embodiment 2

The following description will discuss Embodiment 2 of the present invention. Note that, for convenience, a member having a function identical to that of a member described in the foregoing embodiment will be given an identical reference numeral, and will not be described below.

Figure 7:
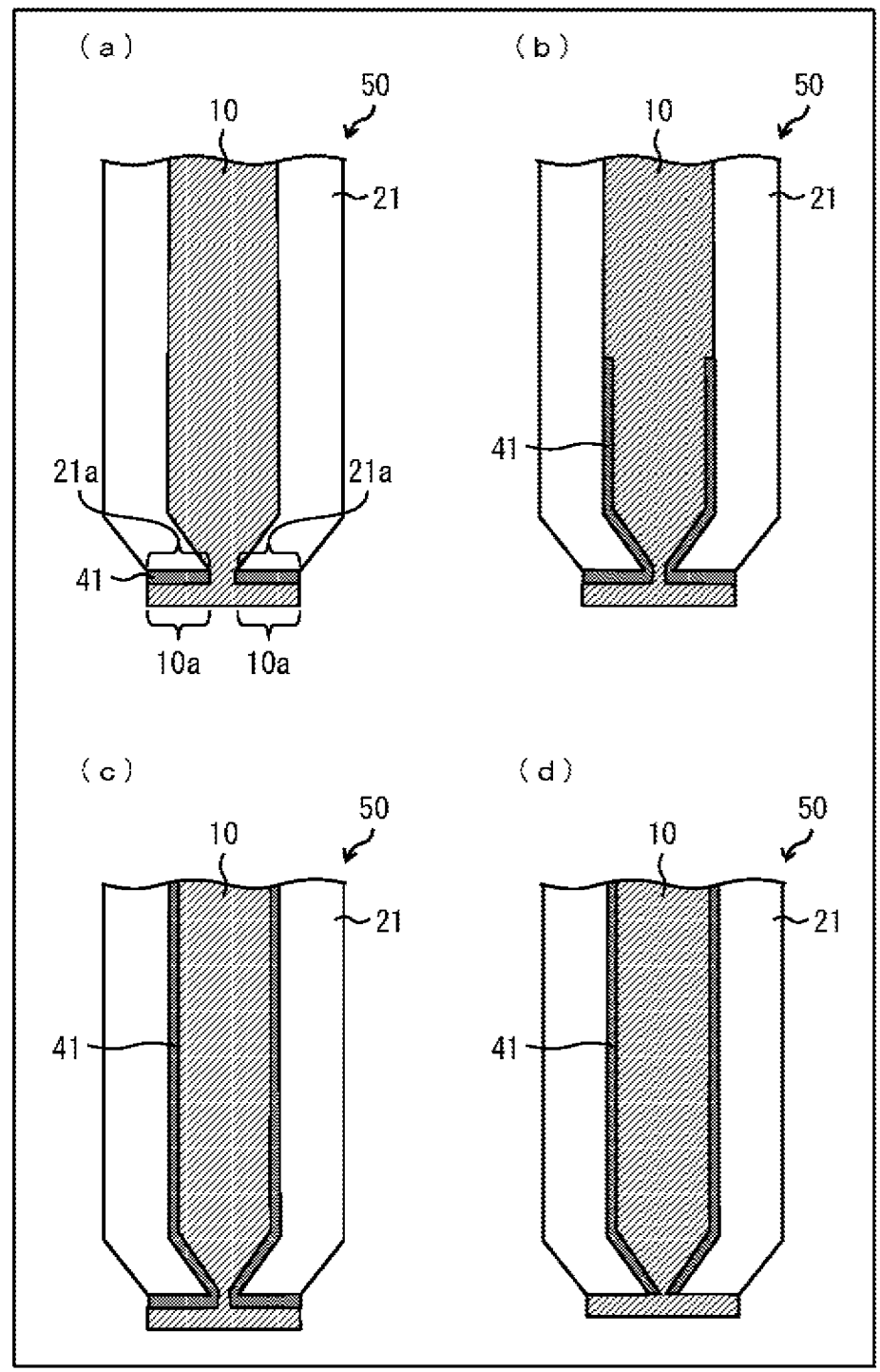
FIG. 7 is a side cross-sectional view schematically illustrating a configuration of a sample separating instrument in accordance with Embodiment 2 of the present invention.

FIG. 7 is a side cross-sectional view schematically illustrating a configuration of a sample separating instrument 50 in accordance with Embodiment 2 of the present invention. As illustrated in FIG. 7, the sample separating instrument 50 in accordance with Embodiment 2 includes fixing layers (fixing section) 41 for fixing a separation medium 10 to a holding section 21. (a) of FIG. 7 illustrates a configuration in which the fixing layers 41 are provided so as to be located between (i) edge parts 21a and extending parts 10a. (b) of FIG. 7 illustrates configuration in which the fixing layers 41 are provided so as to be located between (i) the edge parts 21a and (ii) the extending parts 10a and also partially located between (I) inner surfaces of the holding section 21 and (II) the separation medium 10 which is held in the holding section 21. (c) of FIG. 7 illustrates a configuration in which the fixing layers 41 are provided so as to be located between (i) the edge parts 21a and (ii) the extending parts 10a and also entirely located between (I) the inner surfaces of the holding section 21 and (II) the separation medium 10 which is held in the holding section 21. (d) of FIG. 7 illustrates a configuration in which the fixing layers 41 are provided so as to be entirely located between (I) the inner surfaces of the holding section 21 and (II) the separation medium 10 which is held in the holding section 21.

In particular, by providing the fixing layers 41, for fixing the separation medium 10 to the holding section 21, so that the fixing layers 41 are located between (i) the edge parts 21a and (ii) the extending parts 10a as illustrated in (a) through (c) of FIG. 7, it is possible to suitably avoid detachment of the extending parts 10a from the edge parts 21a due to friction between the extending parts 10a and a transfer membrane 11. This allows an opening-21b-corresponding part of an exposed part 10b to be protected by the extending parts 10a. It is therefore possible to more improve durability of an end part of the separation medium 10 which end part is in contact with the transfer membrane 11.

Further, by providing the fixing layers 41, for fixing the separation medium 10 to the holding section 21, so that the fixing layers 41 are located between (I) the inner surfaces of the holding section 21 and (II) the separation medium 10 which is held in the holding section 21, as illustrated in (b) through (d) of FIG. 7, it is possible to more firmly fix the separation medium 10 to the holding section 21. This makes it possible to prevent a buffer solution, bubbles, or the like from coming between the separation medium 10 and the holding section 21, and accordingly makes it possible to prevent electrophoresis from going wrong.

Note that it is assumed that the sample separating instrument 50 in accordance with Embodiment 2 is used for emission transfer. According to a typical electrophoretic gel, it is necessary to detach the gel from a holding section which holds the gel., in a later step in an experiment. Therefore, adhesion of the gel to the holding section is limitative. In contrast, according to the sample separating instrument 50 in accordance with Embodiment 2, it is not necessary to detach the separation medium 10 from the holding section 21 in a later step. It is rather preferable to more firmly fix the separation medium 10 to the holding section 21.

Each of the fixing layers 41 can include, for example, an adhesive layer, a porous layer, and/or a film layer.

The adhesive layer, included in each of the fixing layers 41, can be an adhesive layer which causes the separation medium 10 to adhere to the holding section 21. Examples of an adhesive of which the adhesive layer is made include publicly-known adhesives such as an ultraviolet curable adhesive, an anaerobic adhesive, and an acrylic adhesive. The adhesive layer can be formed by, for example, (i) applying the adhesive to the holding section 21, (ii) filling the holding section 21 with the separation medium 10, and then (iii) curing the adhesive. Note however that how to form the adhesive layer is not limited to such a method. By thus using the adhesive layer as each of the fixing layers 41, it is possible to firmly fix the separation medium 10 to the holding section 21.

The porous layer, included in each of the fixing layers 41, can be a porous layer formed on a surface(s) of the holding section 21. In a case where the porous layer is formed on the surface(s) of the holding section 21, the separation medium 10 is formed so that part of the separation medium 10 is included in the porous layer. In this case, since the part of the separation medium 10, which part is included in the porous layer, is integrated with part of the separation medium 10 which part is located on the porous layer, the separation medium 10 is fixed to the surfaces) of the holding section 21. The porous layer can be formed on the surface(s) of the holding section 21 by, for example, an oxygen plasma treatment, a UV ozone treatment, a sandblasting treatment, a chemical treatment in which the fixing section is etched, or a mixed treatment of any of such treatments. By thus using the porous layer as each of the fixing layers 41, it is possible to firmly fix the separation medium 10 to the holding section 21.

The film, included in each of the fixing layers 41, can be a film whose one surface adheres to a surface(s) of the holding section 21 and whose other surface adheres to the separation medium 10. An adhesive can be, for example, applied to the one surface of the film, which one surface is located on a holding section 21 side, so that the film adheres to the surface(s) of the holding section 21. Unevenness can be, for example, developed on the other surface of the film, which other surface is located on a separation medium 10 side, so that an area of a region of the film which region is to be in contact with the separation medium 10 is increased and thereby the film is in close contact with the separation medium 10. Examples of such a film include a so-called moth-eye film and a film on which a fine structure is formed with use of a mold or the like. Alternatively, a reagent which forms a covalent bond with the separation medium 10 can be, for example, applied to the other surface of the film, which other surface is located on the separation medium 10 side. As a base material of the film, a plastic film made of a resin such as TAC or PET can be used. The film can be used by being attached to the surface(s) of the holding section 21. By thus using the film as each of the fixing layers 41, it is possible to easily fix the separation medium 10 to the holding section 21.

Embodiment 3

The following description will discuss Embodiment 3 of the present invention. Note that, for convenience, a member having a function identical to that of a member described in any of the foregoing embodiments will be given an identical reference numeral, and will not be described below.

Figure 8:
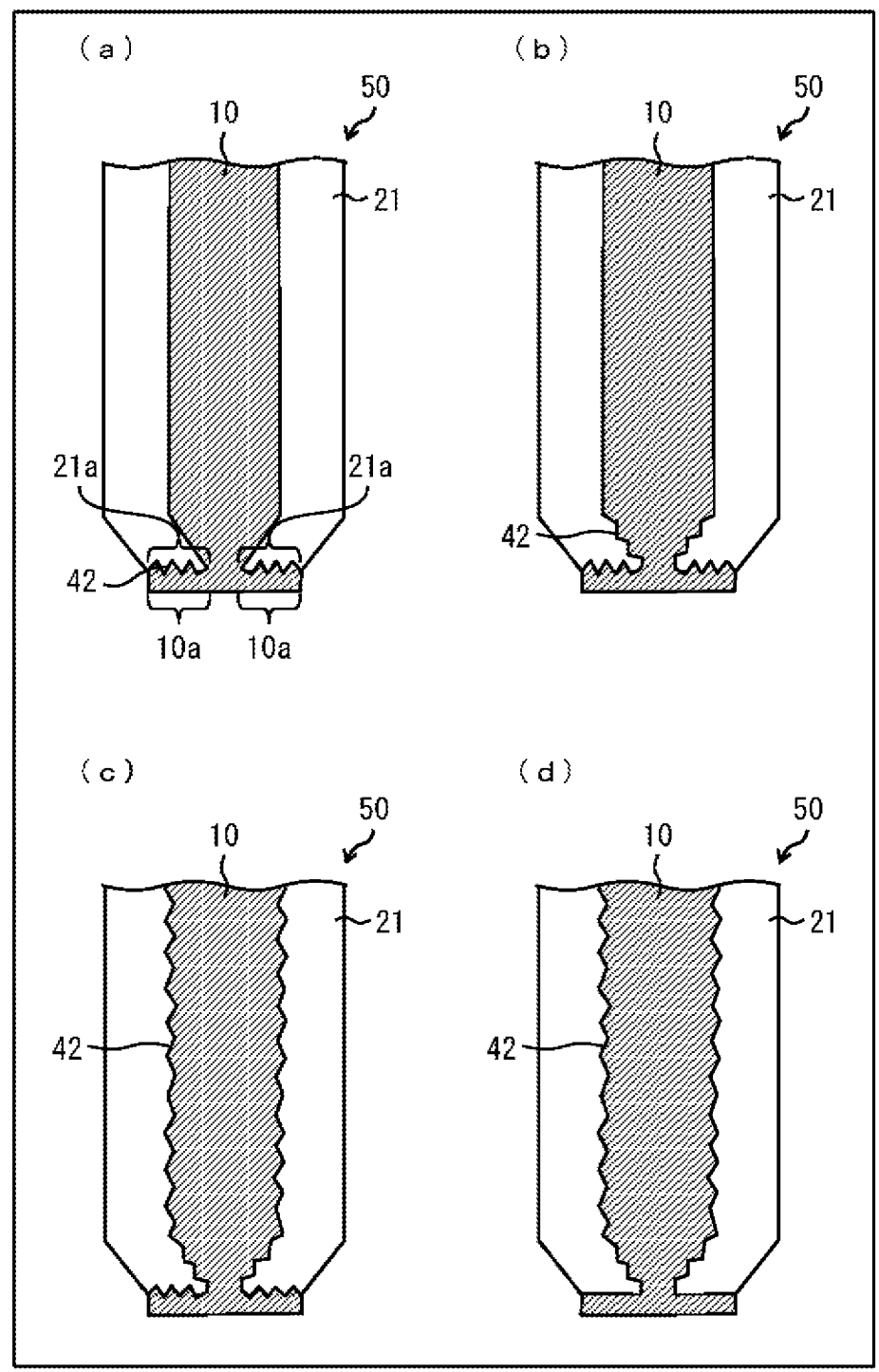
FIG. 8 is a side cross-sectional view schematically illustrating a configuration of a sample separating instrument in accordance with Embodiment 3 of the present invention.

FIG. 8 is a side cross-sectional view schematically illustrating a configuration of a sample separating instrument 50 in accordance with Embodiment 3 of the present invention. As illustrated in FIG. 8, according to the sample separating instrument 50 in accordance with Embodiment 3, a holding section 21 has, on its surfaces, uneven parts (fixing section) 42 so that a separation 20 medium 10 is fixed to the holding section 21. (a) of FIG. 8 illustrates a configuration in which the uneven parts 42 are provided so as to be located between (i) edge parts 21a and extending parts 10a. (b) of FIG. 8 illustrates configuration in which the uneven parts 42 are provided so as to be located between (i) the edge parts 21a and (ii) the extending parts 10a and also partially located between (I) inner surfaces of the holding section 21 and (II) the separation medium 10 which is held in the holding section 21 of FIG. 8 illustrates a configuration in which the uneven parts 42 are provided so as to be located between (i) the edge parts 21a and (ii) the extending parts 10a and also entirely located between (I) the inner surfaces of the holding section 21 and (II) the separation medium 10 which is held in the holding section 21. (d) of FIG. 8 illustrates a configuration in which the uneven parts 42 are provided so as to be entirely located between (I) the inner surfaces of the holding section 21 and (II) the separation medium 10 which is held in the holding section 21. The uneven parts 42 causes an increase in area of a region of the holding section 21 which region is to be in contact with the separation medium 10, and thereby causes the holding section 21 to be in close contact with the separation medium 10. This allows the separation medium 10 to be firmly fixed to the holding section 21.

In particular, by providing the uneven parts 42, for fixing the separation medium 10 to the holding section 21, so as to be located on the extending parts 10a as illustrated in (a) through (c) of FIG. 8, it is possible to suitably avoid detachment of the extending parts 10a from the edge parts 21 a due to friction between the extending parts 10a and a transfer membrane 11. This allows an opening-21b-corresponding part of an exposed part 10b to be protected by the extending parts 10a. It is therefore possible to more improve durability of an end part of the separation medium 10 which end part is in contact with the transfer membrane 11.

Further, by providing the uneven parts 42, for fixing the separation medium 10 to the holding section 21, so as to be located on the inner surfaces of the holding section 21 as illustrated in (b) through (d) of FIG. 8, it is possible to more firmly fix the separation medium 10 to the holding section 21. This makes it possible to prevent a buffer solution, bubbles, or the like from coming between the separation medium 10 and the holding section 21, and accordingly makes it possible to prevent electrophoresis from going wrong.

Each of the uneven parts 42 can be formed by, for example, forming a fine structure on a surface(s) of the holding section 21 with use of a mold or the like. Alternatively, each of the uneven parts 42 can be formed by roughening the surface(s) of the holding section 21 by a sandblasting method, an $O_2$ plasma method, or the like.

Embodiment 4

The following description will discuss Embodiment 4 of the present invention. Note that, for convenience, a member having a function identical to that of a member described in any of the foregoing embodiments will be given an identical reference numeral, and will not be described below.

Figure 9:
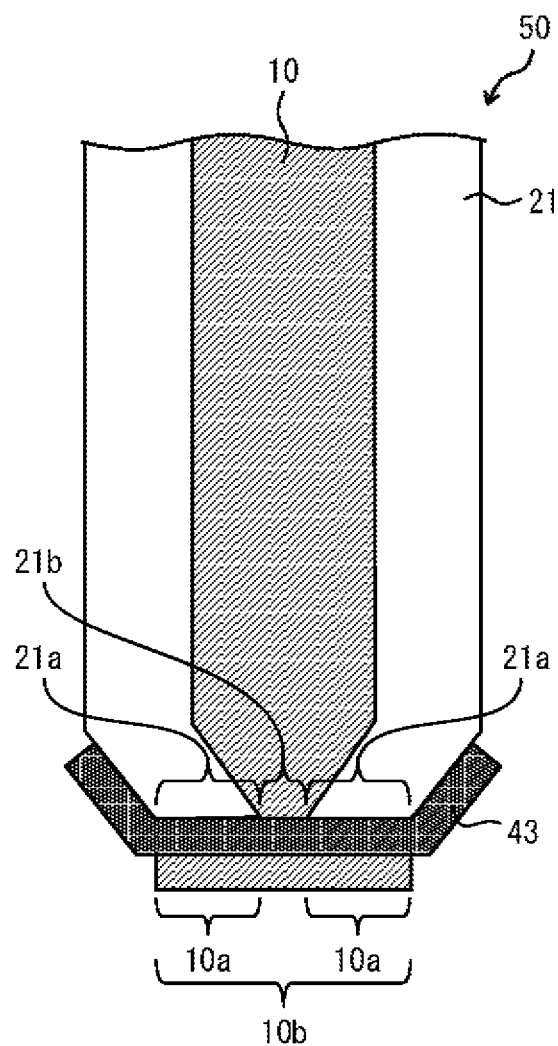
FIG. 9 is a side cross-sectional view schematically illustrating a configuration of a sample separating instrument in accordance with Embodiment 4 of the present invention.

FIG. 9 is a side cross-sectional view schematically illustrating a configuration of a sample separating instrument 50 in accordance with Embodiment 4. As illustrated in FIG. 9, the sample separating instrument 50 in accordance with Embodiment 4 includes a porous membrane (fixing section) 43 which is adhered to a holding section 21 so as to cover an opening 21b. The porous membrane 43 includes therein a separation medium 10. The separation medium 10 which is included in the porous membrane 43 is integrated with (i) the separation medium 10 which is held in a holding section 21 and (ii) an exposed part 10b. In other words, the exposed part 10b is formed in such a manner that the separation medium 10 which is held in the holding section 21 transudes through pores in the porous membrane 43.

This allows an opening-21b-corresponding part of the exposed part 10b to be protected by extending parts 10a. It is therefore possible to more improve durability of an end part of the separation medium 10 which end part is in contact with a transfer membrane 11. Furthermore, the porous membrane 43 makes it possible to prevent swelling of the separation medium 10, held in the holding section 21, from affecting the exposed part 10b.

As the porous membrane 43, a publicly known porous membrane (such as a PVDF membrane) can be, for example, used. The sample separating instrument 50 in accordance with Embodiment 4 can be produced by, for example, (i) adhering the porous membrane 43 to the holding section 21 so that the porous membrane 43 covers the opening 21b, (ii) disposing the holding section 21 above hydrophilic glass so that the holding section 21 is apart from the hydrophilic glass by a distance corresponding to a thickness of the exposed part 10b, (iii) filling the holding section 21 with a precursor (for example, a monomer and a reacting agent each for forming a gel) for forming the separation medium 10, (iv) solidifying the precursor, and then (v) cut the end part of the separation medium 10 thus obtained so that the end part of the separation medium 10 has a desired shape. Note, however, that how to produce the sample separating instrument 50 is not limited to such a method.

Embodiment 5

The following description will discuss Embodiment 5 of the present invention. Note that, for convenience, a member having a function identical to that of a member described in any of the foregoing embodiments will be given an identical reference numeral, and will not be described below.

Figure 10:
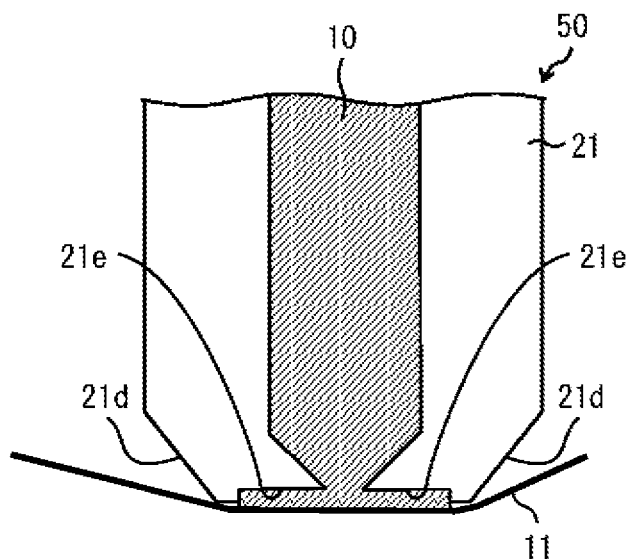
FIG. 10 is a side cross-sectional view schematically illustrating a configuration of a sample separating instrument in accordance with Embodiment 5 of the present invention.

FIG. 10 is a side cross-sectional view schematically illustrating a configuration of a sample separating instrument 50 in accordance with Embodiment 5. As illustrated in FIG. 10, according to the sample separating instrument 50 in accordance with Embodiment 5, edge parts 21a have respective depressions 21e, and parts of extending parts 10a which parts are each located on a holding section 21 side are buried in the respective depressions 21e. This allows movement of the extending parts 10a to be restricted. Furthermore, this lowers a height by which an exposed part 10b protrudes from a holding section 21, and accordingly makes it possible to prevent a transfer membrane 11 from being caught on the exposed part 10b. Moreover, by forming the exposed part 10b so that the exposed part 10b is fit in the depressions 21e, it is possible to make a width of the exposed part 10b narrower, and accordingly possible to prevent the transfer membrane 11 from being caught on the exposed part 10b. Therefore, it is possible to suitably prevent such a problem that the exposed part 10b is distorted by movement of the transfer membrane 11 and thereby an electrophoretic pattern is distorted.

Embodiment 6

The following description will discuss Embodiment 6 of the present invention. Note that, for convenience, member having a function identical to that of a member described in any of the foregoing embodiments will be given an identical reference numeral, and will not be described below.

Figure 11:
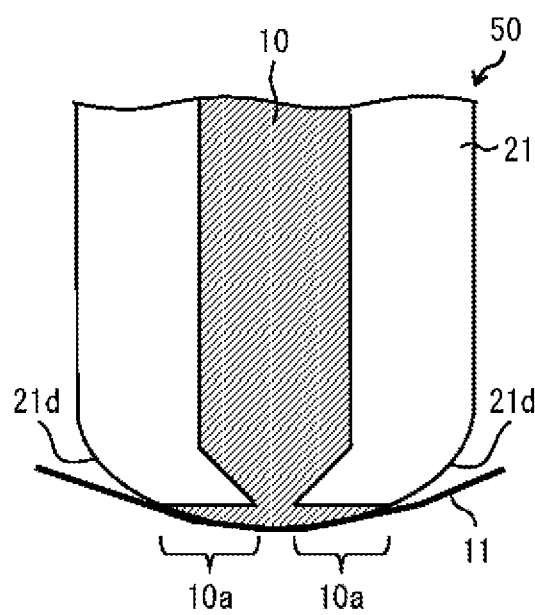
FIG. 11 is a side cross-sectional view schematically illustrating a configuration of a sample separating instrument in accordance with Embodiment 6 of the present invention.

As illustrated in FIG. 11, according to a sample separating instrument 50 in accordance with Embodiment 6, notches 21d in a holding section 21 is rounded, and end parts of extending parts 10a which end parts are each located on a notch 21d side are rounded. This makes it possible to suitably prevent a transfer membrane 11 from being caught on the notches 21d and on the end parts of the extending parts 10a, which end parts are each located on the notch 21d side. It is therefore possible to suitably prevent (i) the transfer membrane 11 from being abraded and (ii) an exposed part 10b from be distorted.

Embodiment 7

The following description will discuss Embodiment 7 of the present invention. Note that, for convenience, a member having a function identical to that of a member described in any of the foregoing embodiments will be given an identical reference numeral, and will not be described below.

Embodiment 1 has described a configuration in which a separation medium 10 is fixed and a transfer membrane 11 is moved. However, the present invention is not limited to such a configuration. It is only necessary that the transfer membrane 11 is moved relative to the separation medium 10 in a state where the transfer membrane 11 is in contact with an exposed part 10b of the separation medium 10.

Figure 12:
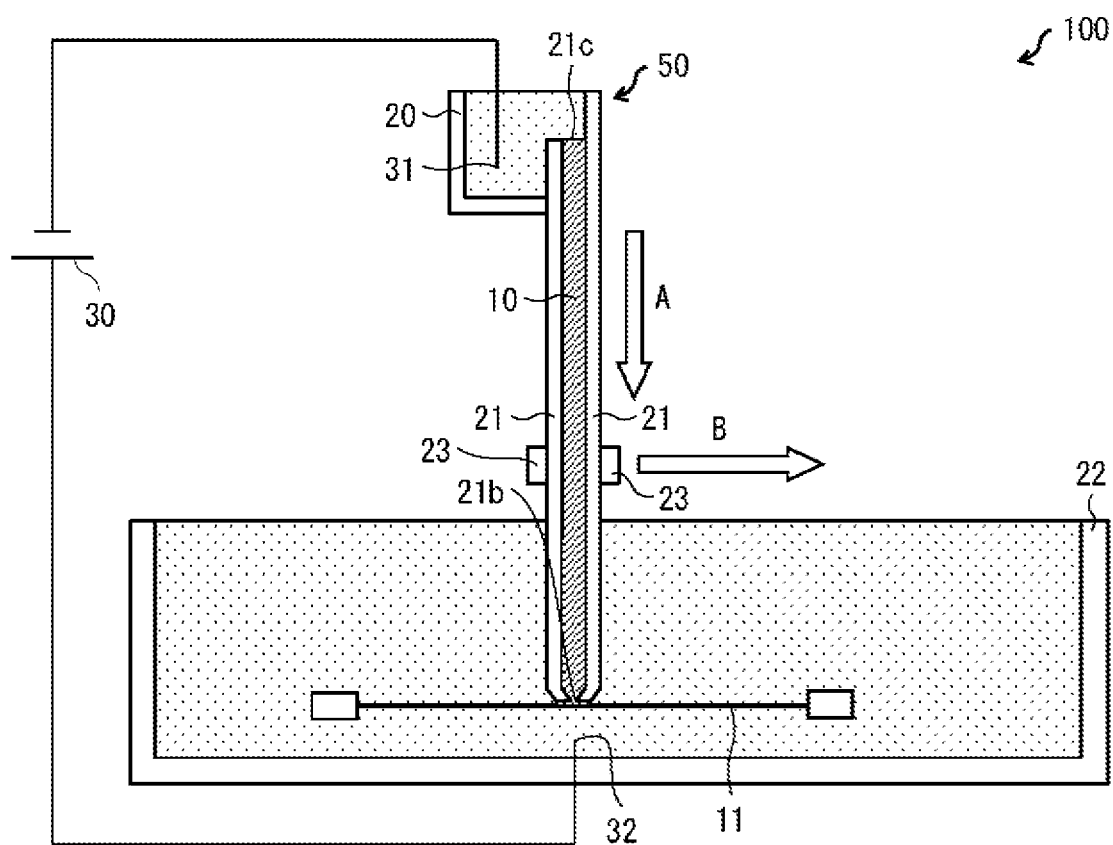
FIG. 12 is a side cross-sectional view schematically illustrating a configuration of a sample analyzing device in accordance with Embodiment 7 of the present invention.

In Embodiment 7, as illustrated in FIG. 12, a transfer membrane 11 is fixed, and a moving section 23 moves a separation medium 10 in a state where an exposed part 10b of the separation medium 10 is in contact with the transfer membrane 11. The moving section 23 can be made up of, for example, a frame which holds a sample separating instrument 50 and (ii) a driving section which moves the frame. A configuration of the driving section is not limited in particular. For example, a configuration such as a ball screw mechanism or a rack-and-pinion mechanism can be employed.

Even such a configuration makes it possible to transfer components of a sample 1 to respective different locations on the transfer membrane 11 depending on time at which the components are emitted from the separation medium 10. It is therefore possible to suitably realize emission transfer.

[Recap]

A sample separating instrument (50) in accordance with a first aspect of the present invention is a sample separating instrument, for use in emission transfer, which includes a separation medium (10) and a holding section (21), the separation medium, in which a sample is electrophoresed, having an end part from which the sample is emitted and transferred to a transfer membrane (11) that is moved in a state where the transfer membrane is in contact with the end part of the separation medium, the holding section, which holds the separation medium, having an opening (21b) on an end part side, the separation medium having an exposed part (10b) which is exposed outside the holding section through the opening, the exposed part having an extending part (10a) which extends on an edge part (21a) of the holding section which edge part is located on a side of the opening.

According to the above configuration, it is possible to provide a novel sample separating instrument which can be suitably used for the emission transfer. That is, according to the above configuration, by forming, from a single member, the exposed part and the separation medium which is held in the holding section, it is possible to easily produce the sample separating instrument. Furthermore, since the extending part functions as a protecting part which protects part of the exposed part which part corresponds to the opening, it is possible to suitably prevent the part of the exposed part, which part corresponds to the opening, from being worn out or distorted. This allows the sample to be suitably transferred from the separation medium to the transfer membrane.

The sample separating instrument in accordance with a second aspect of the present invention can be arranged so as to, in the first aspect, include a fixing section (41, 42) for fixing the separation medium to the holding section, the fixing section being provided so as to be located between the edge part and the extending part.

According to the above configuration, it is possible to suitably avoid detachment of the extending part from the edge part due to friction between the extending part and the transfer membrane. This allows the part of the exposed part, which part corresponds to the opening, to be protected by the extending part, and ultimately allows transfer to be suitably carried out.

The sample separating instrument in accordance with a third aspect of the present invention can be arranged such that, in the second aspect, the fixing section includes an adhesive layer (41).

According to the above configuration, by employing the adhesive layer as the fixing section, it is possible to firmly fix the separation medium to the holding section. This makes it possible to suitably avoid detachment of the extending part from the edge part due to the friction between the extending part and the transfer membrane.

The sample separating instrument in accordance with a fourth aspect of the present invention can be arranged such that, in the second aspect, the fixing section includes an uneven part (42) formed on a surface of the holding section.

According to the above configuration, by employing the uneven part as the fixing section, it is possible to increase an area of a region of the holding section which region is to be in contact with the separation medium, and thereby possible to increase adhesion between the separation medium and the holding section. This makes it possible to suitably avoid detachment of the extending part from the edge part due to the friction between the extending part and the transfer membrane.

The sample separating instrument in accordance with a fifth aspect of the present invention can be arranged such that, in the second aspect, the fixing section includes a porous layer (41) formed on a surface of the holding section.

According to the above configuration, by employing, as the fixing section, the porous layer formed on the surface of the holding section, it is possible to form the separation medium so that part of the separation medium is included in the porous layer. This allows the separation medium to be firmly fixed to the holding section. This makes it possible to suitably avoid detachment of the extending part from the edge part due to the friction between the extending part and the transfer membrane.

The sample separating instrument in accordance with a sixth aspect of the present invention can be arranged such that, in the second aspect, the fixing section is a film (41) whose one surface adheres to a surface of the holding section and whose other surface adheres to the separation medium.

According to the above configuration, by employing, as the fixing section, the film whose one surface adheres to the surface of the holding section and whose other surface adheres to the separation medium, it is possible to easily fix the separation medium to the holding section. This makes it possible to suitably avoid detachment of the extending part from the edge part due to the friction between the extending part and the transfer membrane.

The sample separating instrument in accordance with a seventh aspect of the present invention can be arranged such that, in the second through sixth aspects, the fixing section (41, 42) is provided so as to be further located between an inner surface of the holding section and the separation medium which is held in the holding section.

According to the above configuration, it is possible to more firmly fix the separation medium to the holding section. This makes it possible to prevent a buffer solution, bubbles, or the like from coming between the separation medium and the holding section, and accordingly makes it possible to prevent electrophoresis from going wrong.

The sample separating instrument in accordance with an eighth aspect of the present invention can be arranged such that, in the second aspect, the fixing section includes a porous membrane (43) which is adhered to the holding section so as to cover the opening; the porous membrane includes therein the separation medium; and the separation medium which is included in the porous membrane is integrated with (i) the separation medium which is held in the holding section and (ii) the exposed part.

The above configuration allows the part of the exposed part, which part corresponds to the opening, to be protected by the extending part, and ultimately allows the transfer to be suitably carried out. Furthermore, the porous membrane makes it possible to prevent swelling of the separation medium, held in the holding section, from affecting the exposed part.

The sample separating instrument in accordance with a ninth aspect of the present invention can be arranged such that, in the second aspect, the fixing section includes a depression (21e) formed in the edge part; and part of the extending part which part is located on a holding section side is buried in the depression.

According to the above configuration, it is possible to restrict movement of the extending part. Furthermore, since a height by which the exposed part protrudes from the holding section is lowered, it is possible to prevent the transfer membrane from being caught on the exposed part. Moreover, by forming the exposed part so that the exposed part is fit in the depression, it is possible to make a width of the exposed part narrower, and accordingly possible to prevent the transfer membrane from being caught on the exposed part. Therefore, it is possible to suitably prevent such a problem that the exposed part is distorted by movement of the transfer membrane and thereby an electrophoretic pattern is distorted.

The sample separating instrument in accordance with a tenth aspect of the present invention can be arranged such that, in the first through ninth aspects, the separation medium which is held in the holding section is tapered toward the opening.

According to the above configuration, it is possible to suitably converge electric flux lines formed during the electrophoresis. This allows a pattern, obtained by the transfer of the sample, to be clear.

The sample separating instrument in accordance with an eleventh aspect of the present invention can be arranged such that, in the tenth aspect, a width, in a lateral direction, of part of the separation medium which part is located in the opening is not more than 500 µm.

According to the above configuration, it is possible to more suitably converge the electric flux lines formed during the electrophoresis. This allows the pattern, obtained by the transfer of the sample, to be clearer.

The sample separating instrument in accordance a twelfth aspect of the present invention can be arranged such that, in the first through eleventh aspect, an end part of the holding section which end part is located on an opening side has a notch (21d).

According to the above configuration, it is possible to reduce an area of a region of the transfer membrane which region is to be in contact with the holding section. This makes it possible to reduce friction between the holding section and the transfer membrane, and accordingly makes it possible to prevent the transfer membrane form being abraded.

The sample separating instrument in accordance with a thirteenth aspect of the present invention can be arranged such that, in the twelfth aspect, the notch is rounded.

According to the above configuration, it is possible to prevent the transfer membrane from being caught on a corner of the holding section, and accordingly possible to cause the transfer membrane to be in closer contact with the exposed part. This allows the sample to be more suitably transferred to the transfer membrane.

The sample separating instrument in accordance with a fourteenth aspect of the present invention can be arranged such that, in the twelfth or thirteenth aspect, an end part of the extending part which end part is located on a notch side is rounded.

According to the above configuration, it is possible to suitably prevent the transfer membrane from being caught on the end part of the extending part which end part is located on the notch side, and accordingly possible to suitably prevent the exposed part from being distorted.

The sample separating instrument in accordance with a fifteenth aspect of the present invention can be arranged such that, in the first through fourteenth aspects, the extending part extends, from the opening, on the edge part in a movement direction (B) in which the transfer membrane is moved or in a direction opposite to the movement direction; and a width by which the extending part extends from the opening is equal to or greater than a width, in a direction in which the extending part extends, of the opening.

The above configuration allows the part of the exposed part, which part corresponds to the opening, to be protected by the extending part having a sufficient width. This makes it possible to more suitably prevent the part of the exposed part, which part corresponds to the opening, from being worn out or distorted. Therefore, it is possible to more suitably transfer the sample from the separation medium to the transfer membrane.

A sample analyzing device (100) in accordance with a sixteenth aspect of the present invention includes: a sample separating instrument in accordance with the first through fifteenth aspects; an electrode (negative electrode 31 and positive electrode 32) via which an electric current is applied to the separation medium; a transfer membrane; and a moving section (23) which moves the transfer membrane in a state where the transfer membrane is in contact with the end part of the separation medium.

A sample analyzing device (100) in accordance with a seventeenth aspect of the present invention includes: a sample separating instrument in accordance with the first through fifteenth aspects; an electrode (negative electrode 31 and positive electrode 32) via which an electric current is applied to the separation medium; a transfer membrane; and a moving section (23) which moves the separation medium in a state where the end part of the separation medium is in contact with the transfer membrane.

According to the above configuration, it is possible to suitably realize the emission transfer.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

EXAMPLES

As an Example, a sample separating instrument as illustrated in (c) of FIG. 7 was prepared. As a separation medium, a 10% polyacrylamide gel obtained by use of a Bis-Tris buffer solution of pH 7.0 was used. As each of fixing layers, an adhesive layer obtained by application of an ultraviolet curable adhesive (product name: "LOCTITE3301", manufactured by Henkel Ltd.) was used.

The sample separating instrument was incorporated into a sample analyzing device as illustrated in FIG. 2, and electrophoresis and transfer were carried out. As a sample, a prestained marker was used. As a buffer solution, a buffer solution for DIRECT BLOT, manufactured by Sharp Manufacturing Systems, was used. The electrophoresis was carried out with a constant electric current of 50 mA. (a) of FIG. 13 shows a picture of a transfer membrane thus obtained.

As a Reference Example, a sample separating instrument as disclosed in Patent Literature 1 was prepared. That is, a porous membrane was adhered to a holding section so as to cover an opening, and a gel, different from a gel which was held in the holding section, was attached to the porous membrane. As the gel, a 10% polyacrylamide gel obtained by use of a Bis-Tris buffer solution of pH 7.0 was used.

As with the case of the Example, electrophoresis and transfer were then carried out. (b) of FIG. 13 shows a picture of a transfer membrane thus obtained.

Figure 13:
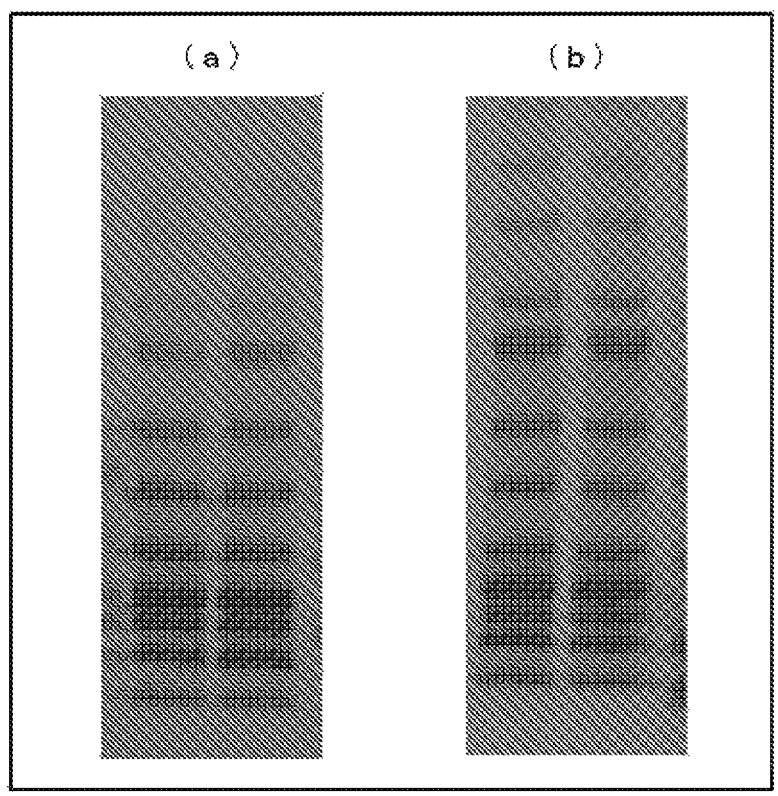
FIG. 13 shows pictures showing results obtained by carrying out emission transfer in Examples.

As illustrated in FIG. 13, in the Example, it was possible to obtain a result which compared favorably with a result obtained in the Reference Example. That is, according to the sample separating instrument and the sample analyzing device in accordance with an aspect of the present invention, it was possible to suitably carry out emission transfer.

This application is based on Japanese Patent Application, Tokugan, No. 2016-042841 filed on Mar. 4, 2016), and claims priority under the Paris Convention to Japanese Patent Application, Tokugan, No. 2016-042841. The contents of Japanese Patent Application, Tokugan, No. 2016-042841 are incorporated herein by reference in their entirety.

REFERENCE SIGNS LIST

1 Sample
10 Separation medium
10a Extending part
10b Exposed part
11 Transfer membrane
21 Holding section
21a Edge part
21b Opening
21c Opening
21d Notch
21e Depression (fixing section)
23 Moving section
24 Guide
31 Negative electrode (electrode)
32 Positive electrode (electrode)
41 Fixing layer (fixing section)
42 Uneven part (fixing section)
43 Porous membrane (fixing section
50 Sample separating instrument
100 Sample analyzing device

What is claimed is:

1. A sample separating instrument, for use in emission transfer, which includes a separation medium and a holding section, the separation medium, in which a sample is electrophoresed, having an end part from which the sample is emitted and transferred to a transfer membrane that is moved in a state where the transfer membrane is in contact with the end part of the separation medium and wherein the transfer membrane is under a tensile force, the holding section, which holds the separation medium, having an opening on an end part side, the separation medium having an exposed part which is exposed outside the holding section through the opening, the exposed part having an extending part which extends on an edge part of the holding section which edge part is located on a side of the opening, the sample separating instrument further comprising a fixing section for fixing the separation medium to the holding section, the fixing section being provided so as to be located between the edge part and the extending part.

2. The sample separating instrument as set forth in claim 1, wherein the fixing section includes an adhesive layer.

3. The sample separating instrument as set forth in claim 1, wherein the fixing section includes an uneven part formed on a surface of the holding section.

4. The sample separating instrument as set forth in claim 1, wherein the fixing section includes a porous layer formed on a surface of the holding section.

5. The sample separating instrument as set forth in claim 1, wherein the fixing section includes a film whose one surface adheres to a surface of the holding section and whose other surface adheres to the separation medium.

6. The sample separating instrument as set forth in claim 1, wherein the fixing section is provided so as to be further located between an inner surface of the holding section and the separation medium which is held in the holding section.

7. The sample separating instrument as set forth in claim 1, wherein the fixing section includes a porous membrane which is adhered to the holding section so as to cover the opening; the porous membrane includes therein the separation medium; and the separation medium which is included in the porous membrane is integrated with (i) the separation medium which is held in the holding section and (ii) the exposed part.

8. The sample separating instrument as set forth in claim 1, wherein the fixing section includes a depression formed in the edge part; and part of the extending part which part is located on a holding section side is buried in the depression.

9. The sample separating instrument as set forth in claim 1, wherein the separation medium which is held in the holding section is tapered toward the opening.

10. The sample separating instrument as set forth in claim 9, wherein a width, in a lateral direction, of part of the separation medium which part is located in the opening is not more than 500 µm.

11. The sample separating instrument as set forth in claim 1, wherein an end part of the holding section which end part is located on an opening side has a notch.

12. The sample separating instrument as set forth in claim 11, wherein the notch is rounded.

13. The sample separating instrument as set forth in claim 11, wherein an end part of the extending part which end part is located on a notch side is rounded.

14. The sample separating instrument as set forth in claim 1, wherein the extending part extends, from the opening, on the edge part in a movement direction in which the transfer membrane is moved or in a direction opposite to the movement direction; and a width by which the extending part extends from the opening is equal to or greater than a width, in a direction in which the extending part extends, of the opening.

15. A sample analyzing device comprising: a sample separating instrument recited in claim 1; an electrode via which an electric current is applied to the separation medium; the transfer membrane; and a moving section which moves the transfer membrane in a state where the transfer membrane is in contact with the end part of the separation medium.

16. A sample separating instrument, for use in emission transfer, which includes a separation medium and a holding section, the separation medium, in which a sample is electrophoresed, having an end part from which the sample is emitted and transferred to a transfer membrane that is moved in a state where the transfer membrane is in contact with the end part of the separation medium and wherein the transfer membrane is under a tensile force, the holding section, which holds the separation medium, having an opening on an end part side, the separation medium having an exposed part which is exposed outside the holding section through the opening, the exposed part having an extending part which extends on an edge part of the holding section which edge part is located on a side of the opening, wherein an end part of the holding section which end part is located on an opening side has a notch.

17. The sample separating instrument as set forth in claim 16, comprising a fixing section for fixing the separation medium to the holding section, the fixing section being provided so as to be located between the edge part and the extending part.

18. The sample separating instrument as set forth in claim 17, wherein the fixing section includes an adhesive layer.

19. The sample separating instrument as set forth in claim 17, wherein the fixing section includes an uneven part formed on a surface of the holding section.

20. The sample separating instrument as set forth in claim 17, wherein the fixing section includes a porous layer formed on a surface of the holding section.

21. The sample separating instrument as set forth in claim 17, wherein the fixing section includes a film whose one surface adheres to a surface of the holding section and whose other surface adheres to the separation medium.

22. The sample separating instrument as set forth in claim 17, wherein the fixing section is provided so as to be further located between an inner surface of the holding section and the separation medium which is held in the holding section.

23. The sample separating instrument as set forth in claim 17, wherein the fixing section includes a porous membrane which is adhered to the holding section so as to cover the opening; the porous membrane includes therein the separation medium; and the separation medium which is included in the porous membrane is integrated with (i) the separation medium which is held in the holding section and (ii) the exposed part.

24. The sample separating instrument as set forth in claim 17, wherein the fixing section includes a depression formed in the edge part; and part of the extending part which part is located on a holding section side is buried in the depression.

25. The sample separating instrument as set forth in claim 16, wherein the separation medium which is held in the holding section is tapered toward the opening.

26. The sample separating instrument as set forth in claim 25, wherein a width, in a lateral direction, of part of the separation medium which part is located in the opening is not more than 500 µm.

27. The sample separating instrument as set forth in claim 16, wherein the notch is rounded.

28. The sample separating instrument as set forth in claim 16, wherein an end part of the extending part which end part is located on a notch side is rounded.

29. The sample separating instrument as set forth in claim 16, wherein the extending part extends, from the opening, on the edge part in a movement direction in which the transfer membrane is moved or in a direction opposite to the movement direction; and a width by which the extending part extends from the opening is equal to or greater than a width, in a direction in which the extending part extends, of the opening.

30. A sample analyzing device comprising: a sample separating instrument recited in claim 16; an electrode via which an electric current is applied to the separation medium; the transfer membrane; and a moving section which moves the transfer membrane in a state where the transfer membrane is in contact with the end part of the separation medium.

* * * * *